(12) United States Patent
May

(10) Patent No.: US 7,697,912 B2
(45) Date of Patent: *Apr. 13, 2010

(54) METHOD TO ADJUSTABLY CONVERT A FIRST DATA SIGNAL HAVING A FIRST TIME DOMAIN TO A SECOND DATA SIGNAL HAVING A SECOND TIME DOMAIN

(75) Inventor: Michael R. May, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1151 days.

This patent is subject to a terminal disclaimer.

(21) Appl. No.: 11/233,085

(22) Filed: Sep. 22, 2005

(65) Prior Publication Data

US 2007/0066265 A1   Mar. 22, 2007

(51) Int. Cl.
*H04B 1/06* (2006.01)
(52) U.S. Cl. .................. 455/260; 455/307; 455/323
(58) Field of Classification Search ......... 455/255–260, 455/307, 323, 324, 333, 334, 338, 339, 340, 455/341
See application file for complete search history.

(56) References Cited

U.S. PATENT DOCUMENTS

| 4,460,890 | A   |   | 7/1984  | Busby |
|-----------|-----|---|---------|-------|
| 5,875,218 | A   | * | 2/1999  | Barham et al. ............... 375/376 |
| 2005/0157779 | A1 | * | 7/2005 | Hasegawa et al. ........... 375/219 |
| 2005/0207291 | A1 |   | 9/2005 | Ogura |
| 2005/0286649 | A1 | * | 12/2005 | Redfern ...................... 375/260 |
| 2006/0192895 | A1 |   | 8/2006 | Bouillet |
| 2007/0064849 | A1 | * | 3/2007 | May ........................... 375/355 |

OTHER PUBLICATIONS

Manlove et al. "A Fully Integrated High-Performance FM Stereo Decoder." IEEE Journal of Solid-State Circuits. vol. 27, No. 3. Mar. 1992. pp. 343-350.

* cited by examiner

*Primary Examiner*—Nhan T Le
(74) *Attorney, Agent, or Firm*—Gary R. Stanford

(57) ABSTRACT

The present invention provides a method to adjustably sample a first digitized signal having a first data rate to produce a second digitized signal having a second data rate. This involves processing the second digitized signal to produce an output signal having a timing component contained therein. An error sensing module determines a timing error between the timing component and a digitized reference period. Then this timing error is used to produce a feedback signal that is applied to the sample timing of the first digitized signal. This allows the second digitized signal to be processed using a time domain associated with the second data rate.

20 Claims, 10 Drawing Sheets handheld audio system 10 radio signal decoder IC 12 radio signal decoder 90 digital radio composite signal 158 example of error correction pilot tracking module 143 low pass filter 172

Loop filter 190

METHOD TO ADJUSTABLY CONVERT A FIRST DATA SIGNAL HAVING A FIRST TIME DOMAIN TO A SECOND DATA SIGNAL HAVING A SECOND TIME DOMAIN

TECHNICAL FIELD OF THE INVENTION

The present invention relates generally to portable handheld digital audio systems and more particularly to integrated circuits within a handheld audio system.

BACKGROUND OF THE INVENTION

As is known, handheld digital audio systems are becoming very popular. Such systems include digital audio players/recorders that record and subsequently playback MP3 files, WMA files, etc. Such digital audio players/recorders may also be used as digital dictaphones and file transfer devices. Further expansion of digital audio players/recorders includes providing a radio receiver such that the device offers frequency modulation (FM) or amplitude modulation (AM) radio reception.

While digital audio players/recorders are increasing their feature sets, the increase in feature sets has been done in a less than optimal manner. For instance, with the inclusion of an FM receiver in a digital audio player/recorder, the FM receiver is a separate integrated circuit (IC) from the digital audio player/recorder chip set, or IC. As such, the FM receiver IC functions completely independently of the digital audio player/recorder IC, even though both ICs include common functionality.

Four papers teach FM receivers that address at least one of the above mentioned issues. The four papers include, "A 10.7-MHz IF-to-Baseband Sigma-Delta A/D Conversion System for AM/FM Radio Receivers" by Eric Van Der Zwan, et. al. IEEE Journal of Solid State Circuits, VOL. 35, No. 12, December 2000; "A fully Integrated High-Performance FM Stereo Decoder" by Gregory J. Manlove et. al, IEEE Journal of Solid State Circuits, VOL. 27, No. 3, March 1992; "A 5-MHz IF Digital FM Demodulator", by Jaejin Park et. al, IEEE Journal of Solid State Circuits, VOL. 34, No. 1, January 1999; and "A Discrete-Time Bluetooth Receiver in a 0.13 µm Digital CMOS Process", by K. Muhammad et. al, ISSCC2004/Session 15/Wireless Consumer ICs/15.1, 2004 IEEE International Solid-State Circuit Conference.

While the prior art has provided FM decoders, a need still exists for a method and apparatus of radio decoding that is optimized to function with a digital audio player/recorder to produce an optimized handheld audio system.

DETAILED DESCRIPTION OF THE INVENTION

Preferred embodiments of the present invention are illustrated in the FIGs., like numerals being used to refer to like and corresponding parts of the various drawings.

Figure 1:
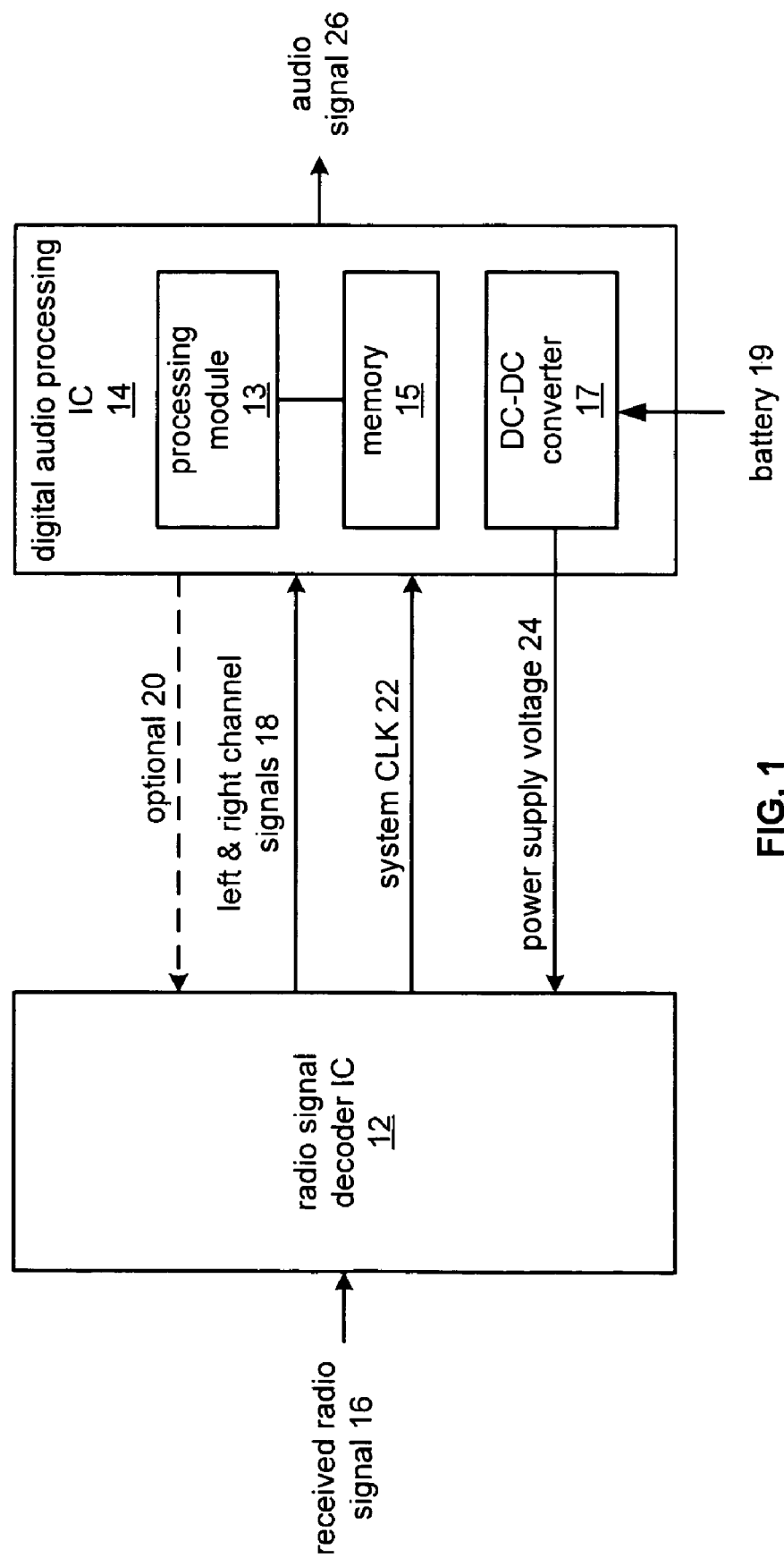
FIG. 1 is a schematic block diagram of a handheld audio system in accordance with the present invention.

FIG. 1 is a schematic block diagram of a handheld audio system 10 that includes radio signal decoder integrated circuit (IC) 12 and digital audio processing IC 14. Digital audio processing IC 14 includes processing module 13, memory 15, and DC-DC converter 17. Processing module 13 may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory 15 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when processing module 13 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, memory 15 stores, and processing module 13 executes, operational instructions corresponding to at least some of the steps and/or functions illustrated in FIGS. 7-11.

When a power source, such as battery 19, is initially applied to digital audio processing IC 14, DC-DC converter 17 generates a power supply voltage 24 based on an internal oscillation. When power supply voltage 24 reaches a desired value such that radio signal decoder 12 can operate, radio signal decoder IC 12 generates system clock 22; with the remaining functionality of radio signal decoder IC 12 being inactive awaiting a second enable signal or being activated once system clock 22 is functioning. Radio signal decoder IC 12 provides system clock 22 to digital audio processing IC 14. Upon receiving system clock 22, the DC-DC converter may switch from the internal oscillation to system clock 22 to produce power supply voltage 24 from V-battery 19, or an external power source. Note that when a portion of radio signal decoder IC 12 is powered via the battery 19, radio signal decoder IC 12 may produce a real time clock (RTC) in addition to producing system clock 22. Radio signal decoder IC 12 may be directly coupled to or coupled via switches to battery 19.

With system clock 22 functioning, radio signal decoder IC 12 converts received radio signal 16 into left and right channel signals 18, which may be analog or digital signals. In one embodiment, left and right channel signals 18 include a Left plus Right (LPR) signal, and a Left Minus Right (LMR)

signal. Radio signal decoding IC 12 provides these left and right channel signals to digital audio processing IC 14.

Digital audio processing IC 14, which may be a digital audio player/recorder IC such as the STMP35XX and/or the STMP36XX digital audio processing system IC manufactured and distributed by Sigmatel Incorporated, receives left and right channel signals 18 and produces there from audio signals 26. Digital audio processing IC 14 may provide audio signals 26 to a headphone set or other type of speaker output. As an alternative to producing audio signals 26 from left and right channel signals 18, digital audio processing IC 14 process stored files, such as but not limited to MP3 files, WMA files, and/or other digital audio files to produce audio signals 26.

A digital radio interface may be used to communicatively couple digital audio processing IC 14 to radio signal decoder IC 12. Such a digital radio interface may generate a data clock of 4 MHz, 6 MHz, or some other rate, in order to support the conveyance of serial data between ICs 12 and 14. In addition, such a digital radio interface formats the data into a packet, or frame, which may include one to five data words having a sampling rate based on the sample rate conversion (SRC) of radio signal decoder IC 12, which will be described in greater detail. Nominally, a packet, or frame, will include four 18-bit words having a sampling rate of at 44.1 KHz per word, 2 of the 18 bits are for control information and the remaining 16 bits are for data.

The digital radio interface may convey more than left and right channel signals 18, which may be in the form of LPR channel signals and LMR channel signals. For instance, such a digital radio interface may convey receive signal strength indications, data clock rates, control information, functionality enable/disable signals, functionality regulation and/or control signals, and radio data service signals between ICs 12 and 14. All of these components may be contained within a composite signal, such as the composite signal described with reference to FIG. 5.

Figure 2:
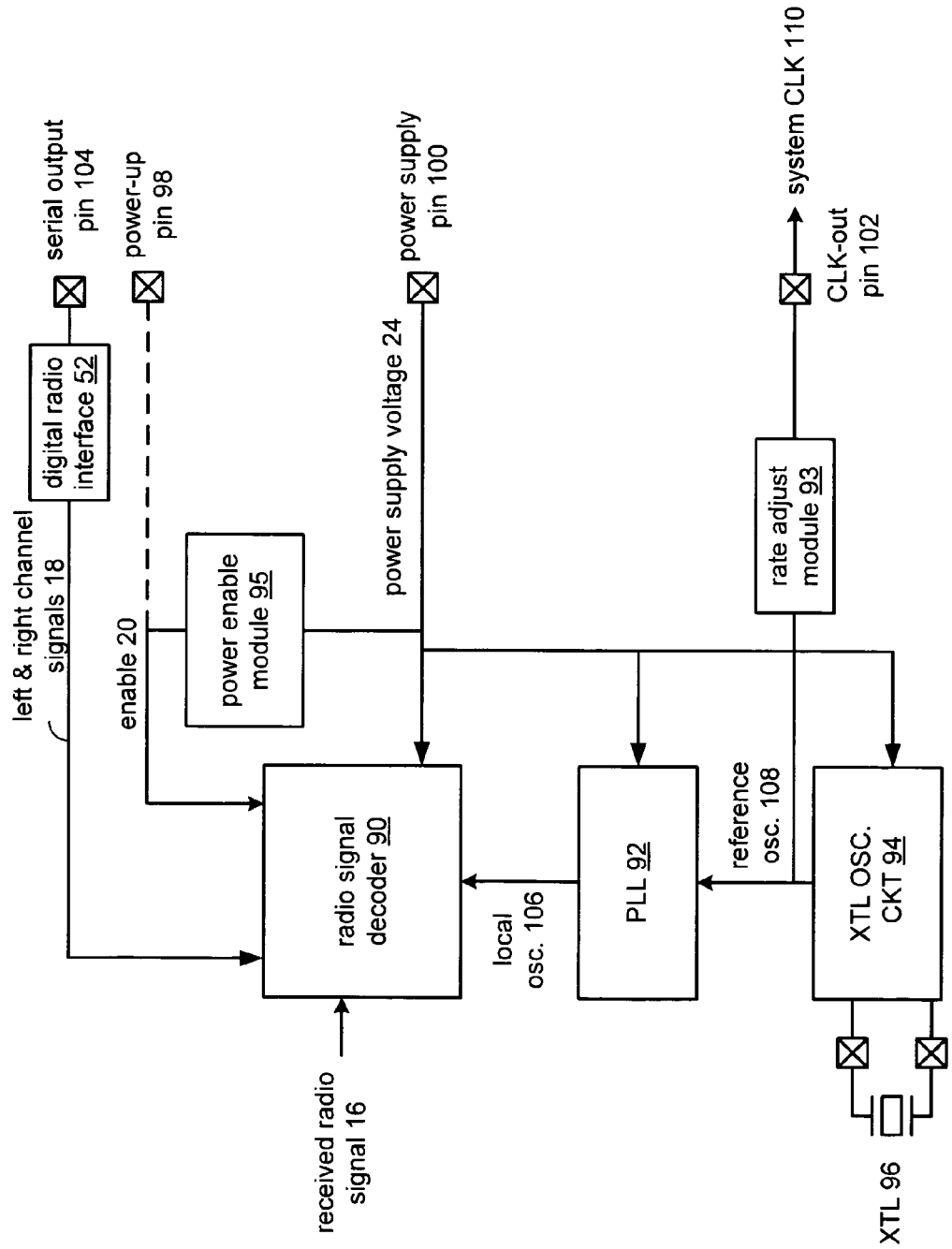
FIG. 2 is a schematic block diagram of a radio signal decoder IC in accordance with the present invention.

FIG. 2 is a schematic block diagram of an embodiment of radio signal decoder IC 12 that includes digital radio interface 52, crystal oscillation circuit (XTL OSC CKT) 94, PLL 92, and radio signal decoder 90. Crystal oscillation circuit 94 is operably coupled to external crystal 96 to produce reference oscillation 108. The rate of reference oscillation 108 is based on the properties of external crystal 96 and, as such, may range from a few kilo-Hertz to hundreds of mega-Hertz. In an embodiment, reference oscillation 108 produces system output clock 110, which is outputted via a clock output (CLK_out) pin 102. As the reader will appreciate, system clock 110 may be identical to reference oscillation 108, may have a rate that is a multiple of reference oscillation 108 via rate adjust module 93, may have a rate that is a fraction of reference oscillation 108 via rate adjust module 93, may have a phase shift with respect to the reference oscillation, or a combination thereof.

PLL 92 also produces local oscillation 106 from reference oscillation 108. The rate of the local oscillation corresponds to a difference between an intermediate frequency (IF) and a carrier frequency of received radio signal 16. For instance, if the desired IF is 2 MHz and the carrier frequency of received radio signal 16 is 101.5 MHz, the local oscillation is 99.5 MHz (i.e., 101.5 MHz–2 MHz). As the reader will appreciate, the IF may range from DC to a few tens of MHz and the carrier frequency of received radio signal 16 is dependent upon the particular type of radio signal (e.g., AM, FM, satellite, cable, etc.). Radio signal decoder 90 may process a high side carrier or a low side carrier of the RF signals and/or IF signals.

Radio signal decoder 90 converts received radio signal 16, which may be an AM radio signal, FM radio signal, satellite radio signal, cable radio signal, into left and right channel signals 18 with local oscillation 106. Radio signal decoder 90 provides the left and right channel signals to digital radio interface 52 for outputting via a serial output pin 104. Serial output pin 104 may includes one or more serial input/output connections. As is further shown, radio signal decoder 90 may receive an enable signal and a power supply voltage from power supply pin 100. Alternatively, a power enable module may generate an enable signal when power supply 24 reaches a desired value.

Figure 3:
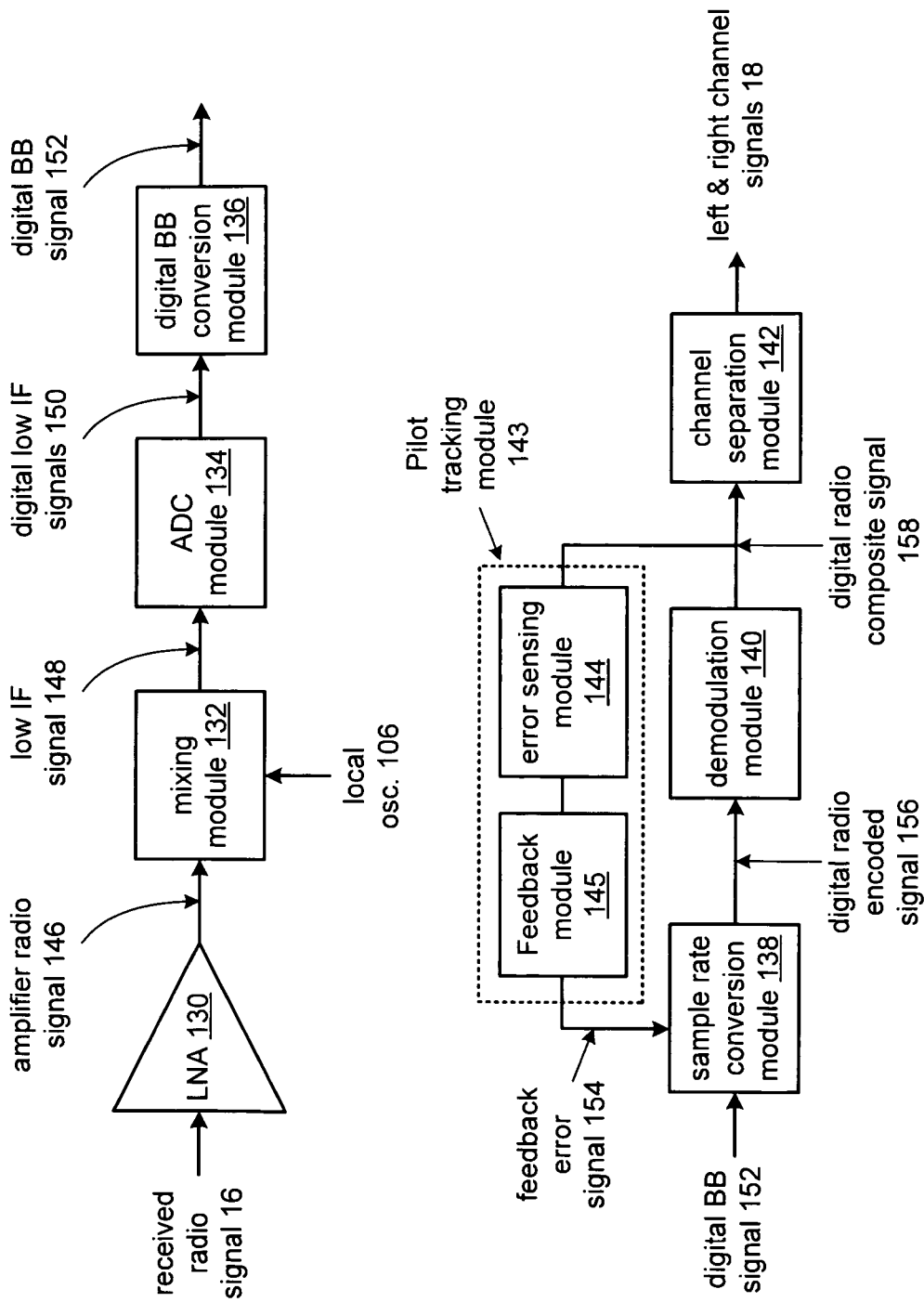
FIG. 3 is a schematic block diagram of a radio signal decoder in accordance with the present invention.

FIG. 3 is a schematic block diagram of a radio signal decoder 90 that includes a low noise amplifier (LNA) 130, mixing module 132, analog-to-digital conversion (ADC) module 134, digital baseband conversion module 136, SRC module 138, demodulation module 140, channel separation module 142, and a pilot tracking module 143 that further includes error sensing module 144 and feedback module 145. In operation, LNA 130 receives radio signal 16 and amplifies radio signal 16 to produce an amplified radio signal 146. The gain at which LNA 130 amplifies receive signal 16 is dependent on the magnitude of received radio signal 16 and automatic gain control (AGC) functionality of radio signal decoder 90. Mixing module 132 mixes amplified radio signal 146 with local oscillation 106 to produce a low IF signal 148. If local oscillation 106 has a frequency that matches the carrier frequency of radio signal 146 low IF signal 148 will have a carrier frequency of approximately zero. If local oscillation 106 is slightly more or less than radio signal 146, then low IF signal 148 will have a carrier frequency based on the difference between the frequency of radio signal 146 and the frequency of local oscillation 106. In such a situation, the carrier frequency of low IF signal 148 may range from 0 hertz to tens of mega-Hertz.

ADC module 134 converts low IF signal 148 into a digital low IF signal 150. In one embodiment, low IF signal 148 is a complex signal including an in-phase component and a quadrature component. Accordingly, ADC module 134 converts the in-phase and quadrature components of low IF signal 148 into corresponding in-phase and quadrature digital signals 150.

Digital baseband conversion module 136 is operably coupled to convert digital low IF signals 150 into digital baseband signals 152. Note that if digital low IF signals 150 have a carrier frequency of approximately zero, digital baseband conversion module 136 primarily functions as a digital filter to produce digital baseband signals 152. If, however, the IF is greater than zero, digital baseband conversion module 136 functions to convert digital low IF signals 150 to have a carrier frequency of zero and performs digital filtering.

SRC module 138, which will be described in greater detail with reference to FIG. 13, receives digital baseband signal 152 and a feedback error signal 154 to produce a digital radio encoded signal 156. The digital baseband signal may be associated with a first time domain such as a time domain associated with the receiver. The digital radio encoded signal (output of the SRC module) may be associated with a second time domain such as that of the transmitter associated with the received radio signal. For example, the digital baseband signal may have a sampling rate of 400 KHz and the rate adjusted encoded signal (digital radio encoded signal 156) may have a sampling rate of 152 KHz or 228 KHz. Demodulation module 140 demodulates digital radio encoded signal 156 to produce a digital radio composite signal 158. Error sensing module 144 interprets radio signal composite signal 158 to produce an input to feedback module 145 which in turn produces feedback error signal 154. This may involve performing a pilot tracking function associated with a pilot tone within the composite signal. Channel separation module 142 is operably coupled to produce left and right channel signals 18 from digital radio composite signal 158.

Figure 4:
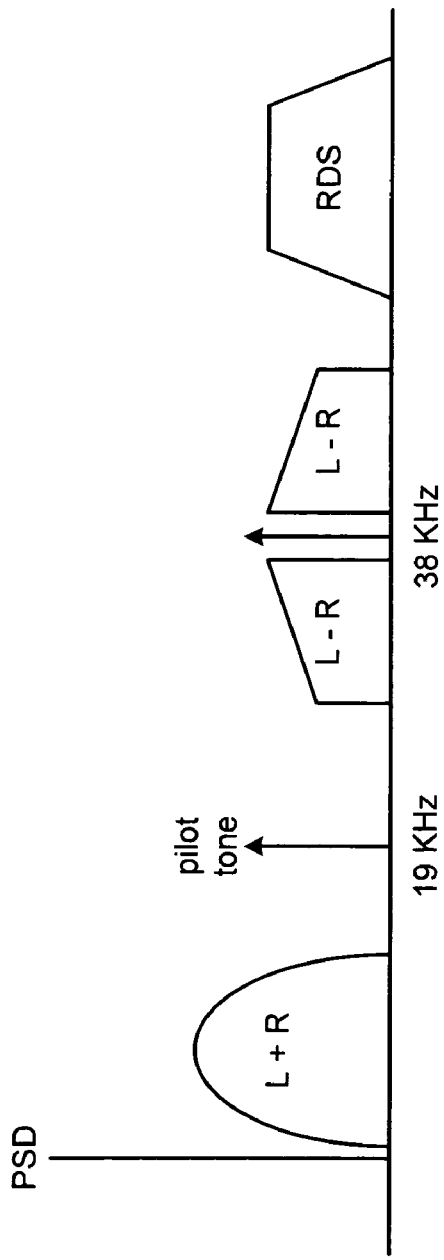
FIG. 4 is a frequency spectrum diagram of a digital radio composite signal in accordance with the present invention.

FIG. 4 is a frequency diagram of received radio signal 16, which in this embodiment is shown as composite signal 158 used to carry stereophonic audio under a pilot-tone multiplex system. A pilot-tone multiplex system multiplexes the left and right audio signal channels in a manner compatible with mono sound, using a sum-and-difference technique to produce a "mono-compatible" composite signal. Signal 16 includes a pilot tone having known properties, in some embodiments this pilot tone is located at 19 kHz and another tone is located at 38 kHz. Signal 16 also includes a low frequency "sum" or LPR signal component, a higher frequency "difference" or LMR signal component, and may include a radio data system (RDS) signal component. LPR signal component includes mono signal information, and LMR signal component includes stereo signal information. LMR signal component, as shown, is modulated on the 38 kHz suppressed subcarrier to produce a double sideband suppressed carrier signal (DSBCS). The RDS signal component contains small amounts of digital information. Such digital information may include time and radio station identification, and uses a sub-carrier tone at 57 kHz to carry data at 1187.5 bits-per-second.

Returning to FIG. 3, pilot tracking module 143 utilizes the known properties of the 19 KHz pilot tone and the corresponding properties of the actual pilot tone (timing component) embedded within digital composite radio signal 158 to determine error feedback signal 154. In such an embodiment, SRC module 138 removes errors due to process variation, temperature variations, crystal make tolerance, et cetera from digital baseband signals 152 prior to demodulation via feedback to an interpolation module. A linear interpolator may be implemented using a linear SRC module, such as SRC module 138 of FIG. 3, and sigma-delta modulator, such as sigma-delta modulator 194 of FIG. 7. As such, the demodulation errors of prior art embodiments are avoided by correcting this signal prior to demodulation by demodulation module 140.

Figure 5:
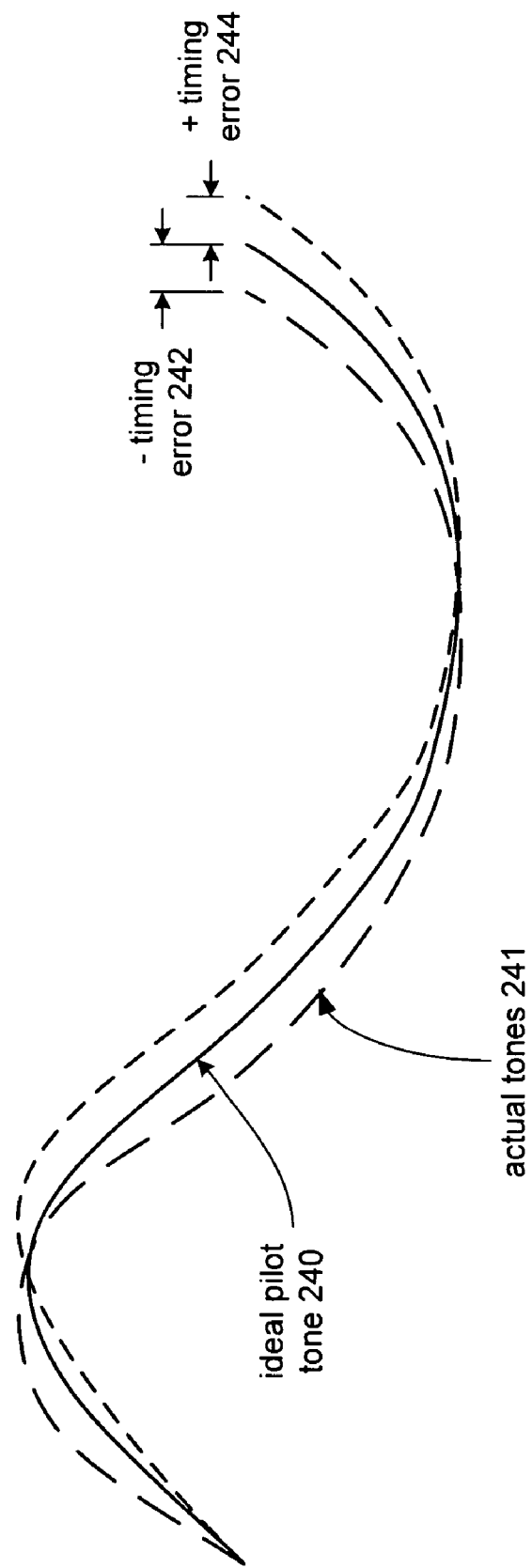
FIG. 5 is a diagram of an example of error correction in accordance with the present invention.

FIG. 5 is an example of the functionality of error correction performed by a pilot tracking module 143, SRC module 138 and demodulation module 140. In this illustration, a reference pilot tone 240 is shown as a solid line while actual pilot tone measurements 241 are indicated by dashed lines. Error sensing module 144 determines a timing error 242 or 244 of actual (measured) pilot tone signal 241, which corresponds to a timing component within digital radio signal 158, with respect to a digitized reference period (reference pilot tone signal 240). Feedback error signal 154 corresponds to the timing error such that SRC module 138 adjusts the SRC based on the timing error, thereby substantially eliminating timing errors prior to decoding.

Figure 6:
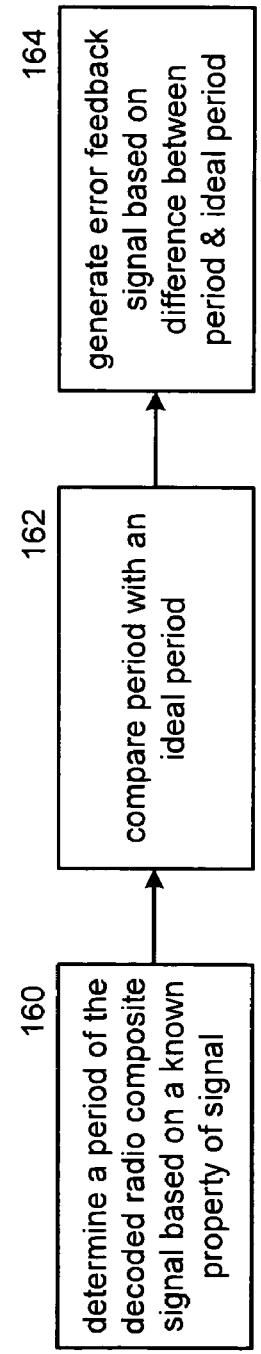
FIG. 6 is a logic diagram illustrating the functionality of an error sensing module in accordance with the present invention.

FIG. 6 is a logic diagram generally illustrating the functionality of the error sensing module. The processing of the error sensing module begins at Step 160 where it determines a period of the decoded radio composite signal based on a known property of the signal such as a pilot tone (e.g., 19 KHz or 38 KHz) or other like timing component. The processing then proceeds to Step 162 where the error sensing module compares the measured period of the decoded radio composite signal with a reference period of the radio composite signal. For example, the error sensing module compares the measured frequency of the 19 KHz pilot tone with the known reference period of the 19 KHz pilot tone. These differences were illustrated in FIG. 5.

The processing then proceeds to Step 164 where the error sensing module is utilized by a feedback module to generate an error feedback signal based on a difference between the measured period and the reference period. For example, if the actual period of the pilot tone is measurable different from the reference pilot tone, the error sensing module generates an error feedback signal to indicate the phase and/or frequency difference between the measured period of the pilot tone and the reference period of the pilot tone.

Figure 7:
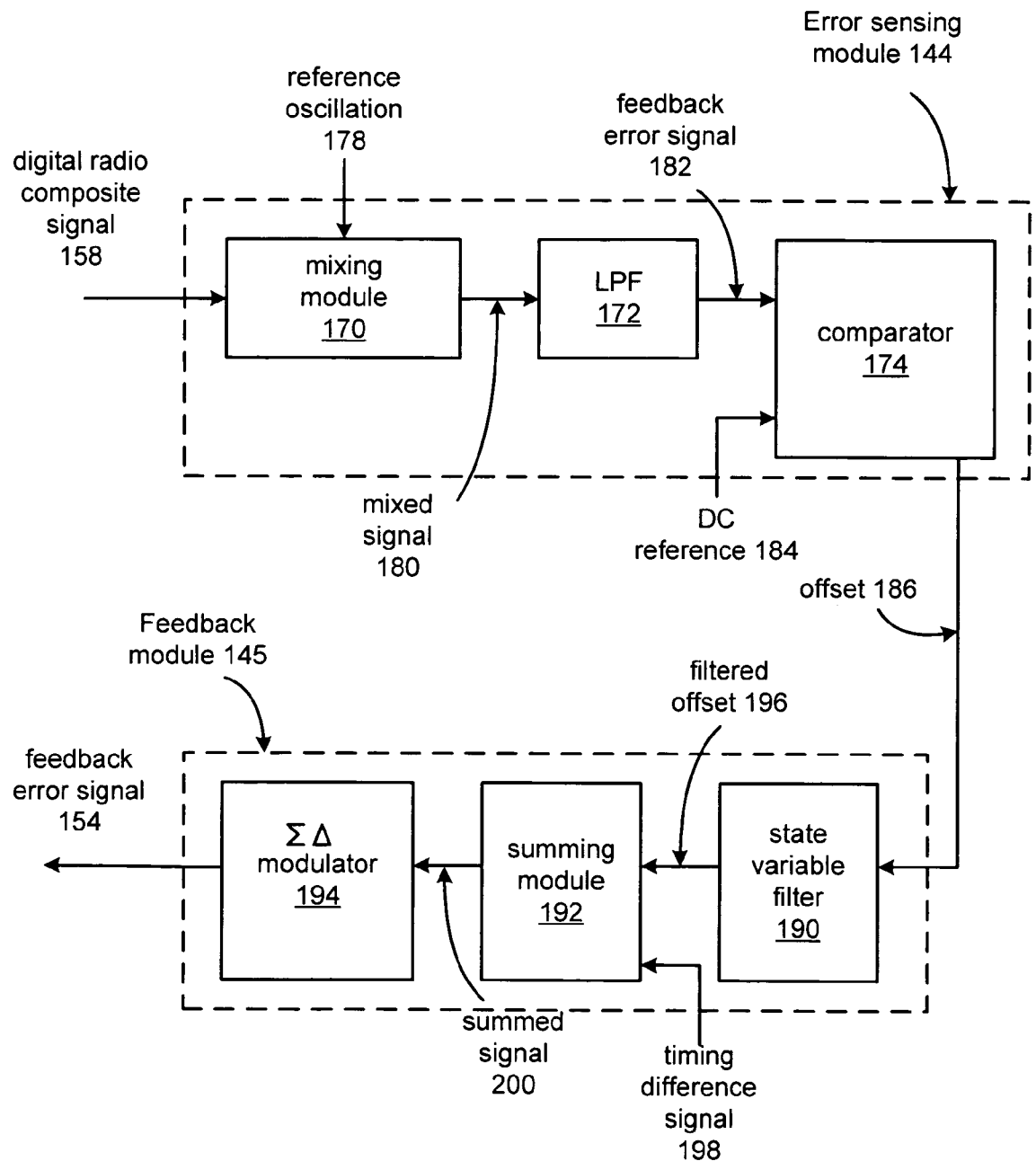
FIG. 7 is a schematic block diagram of an pilot tracking module in accordance with the present invention.

FIG. 7 is a schematic block diagram of an embodiment of pilot tracking module 143 that describe error sensing module 144 and feedback module 145 in further detail. In this embodiment, error sensing module 144 includes a mixing module 170, a low pass filter (LPF) 172, and a comparator 174. Feedback module 145 includes a state variable filter 190, a summing module 192 and a Sigma Delta modulator 194. Mixing module 170 compares a digital reference period 178 (e.g., a 19 KHz tone to represent the reference pilot tone) with digital radio composite signal 158 received from the output of demodulation module 140 of FIG. 3. Mixing module 170, which may include a digital mixer, produces a mixed signal 180 (e.g., $\sin(\omega_1 t)*\sin(\omega_2 t) = \frac{1}{2}\cos(\omega_1-\omega_2)t - \frac{1}{2}\cos(\omega_1+\omega_2)t$, where $\omega_1$ represent $2\pi*f$ of the reference pilot tone and $\omega_2$ represents $2\pi*f$ of the measured pilot tone).

Figure 8:
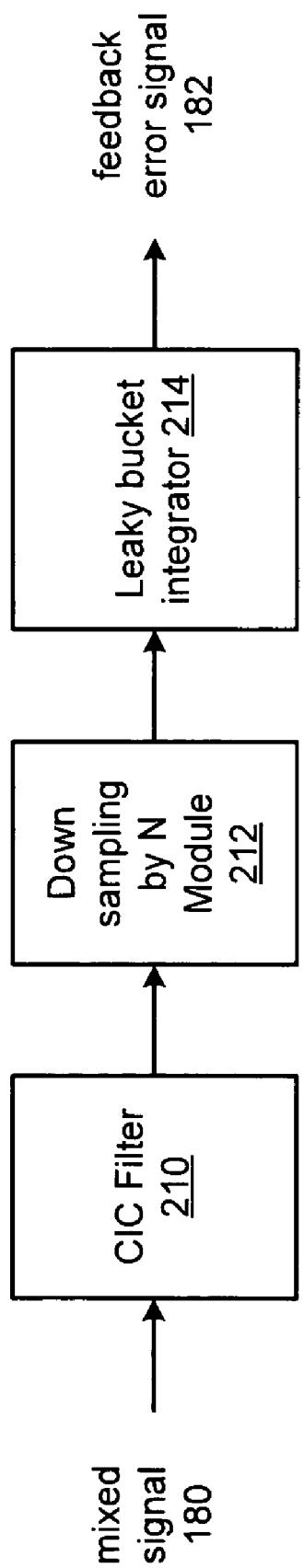
FIG. 8 is a schematic block diagram of a filter within the pilot tracking module of FIG. 7 in accordance with the present invention.

One embodiment of low pass filter 172, as shown in FIG. 8, includes a cascaded integrated comb (CIC) filter 210, down sampling by N module 212, and a leaky bucket integrator 214 coupled in series. Low pass filter 172, which may be a multi-order CIC filter having a $2^n$ down sampling factor, filters mixed signal 180 to produce a near-DC feedback error signal 182 (e.g., filters out the $-\frac{1}{2}\cos(\omega_1+\omega_2)t$ term and passes the $\frac{1}{2}\cos(\omega_1-\omega_2)t$ term). A leaky bucket integrator may also be included to perform further filtering in order to create a filtered phase error correction signal that is supplied to detector/comparator 174. This filter function may set the clock recovery loop bandwidth.

Comparator 174 compares near DC feedback error signal 182 with a null signal or DC reference 184 to produce an offset 186 (e.g., determines the difference between $\omega_1$ & $\omega_2$ to produce the offset). Comparator 174 may also be described as comparing the carrier frequency of filtered signal 182 with DC to determine phase error. If the frequency of composite signal 158 matches the frequency of digital reference period 178, near DC feedback error signal 182 will have a zero frequency such that offset 186 will be zero. If, however, the frequency of composite signal 158 does not substantially match the frequency of digital reference period 178, near DC feedback error signal 182 will have a non-DC frequency. Offset 186 reflects the offset of the near DC error feedback signal from DC.

Further processing converts offset 186 into error feedback signal 154 as follows. State variable filter 190 filters offset 186 to produce a filtered offset 196. State variable filter 190 is analogous to a loop filter within a PLL that includes a resistive term and a capacitive term to integrate offset 186. The direct term included within the input to the state variable filter is analogous to the resistor in an analog PLL loop filter. An integration term within the input to the state variable filter is analogous to a large capacitor in an analog PLL loop filter. This state variable filter provides a memory element operable to store the correction output of detector/comparator 174.

Figure 9:
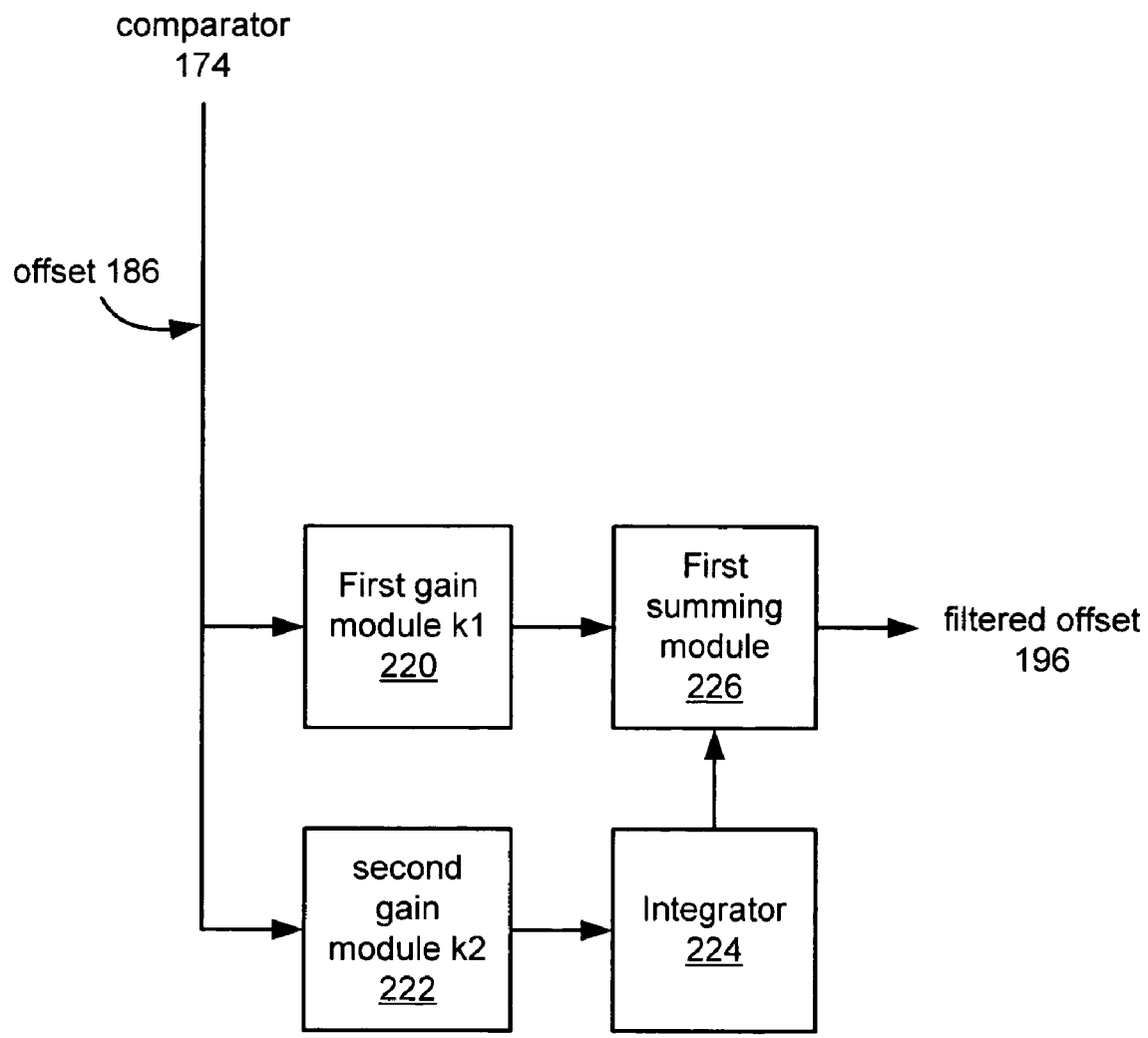
FIG. 9 is a schematic block diagram of a loop filter within the pilot tracking module of FIG. 7 in accordance with the present invention.

The loop filter, depicted as loop filter (state variable filter) 190 in FIG. 7 and described in further detail with reference to FIG. 9, includes a first gain module k1 220, a second gain module k2 222, an integrator 224, a first summing module 226, and a second summing module 228. First gain module 220 and second gain module 222 receive the output, offset 186, of the comparator 174. The output of second gain module 222 is provided to integrator 224. The output first gain module 220 and integrator 224 are summed with first summing module 226. Summing module 192 of FIG. 7 sums the output of first summing module 226 with a level signal (i.e. timing difference signal 198) to normalize the output of the loop filter (state variable filter) for the quantizer.

The output of state variable filter 190 is provided to a first order sigma delta modulator 194 to quantize the correction into time intervals that may be implemented by an interpolator. A nominal sigma delta signal (i.e. estimated timing difference signal 198) may be combined with the output of the state variable filter with summing module 192 in order to provide the input to sigma delta modulator 194. Sigma delta modulator 194 provides a correction signal (i.e. feedback error signal) to interpolator or SRC in order to maintain and track the difference between the timing component within the received RF signal and the reference tone within the receiver.

Summing module 192 sums filtered offset 196 with a timing difference signal 198 to produce a summed signal 200. Timing difference signal 198 is a known timing difference signal such that filtered offset signal 196 represents only the unknown timing differences in the system due to such things that include process tolerance and temperature drift. Sigma Delta modulator 194 quantizes summed signal 200 to produce feedback error signal 154.

The decoder utilized within radio signal decoder IC 12, may also be utilized as a stand-alone decoder for decoding digitally encoded signals that are transmitted from a separate device. In such an embodiment, the decoder would include a SRC module, decoding module and error sensing module. The SRC module is operably coupled to convert, based on error feedback signal, the rate of an encoded signal from a first rate to a second rate to produce a rate adjusted encoded signal. The decoder may further include a sampling module. The sampling module receives an input signal and samples the signal at a given sampling rate to produce an encoded signal. The input signal may be a digital signal. In general, the decoder functions to receive the input signal, which is generated with respect to a first clock domain (e.g., the clock domain of the transmitter). The sampling module samples the input signal with a second clock domain (e.g., the clock domain of the receiver) and the SRC coverts the samples from the rate of the second clock domain to the rate of the first cock domain. The decoding module then processes the data at the rate of the first clock domain.

Linear SRC module converts digitally filtered signal into a sample rate adjusted digital signal based on a control feedback signal. This control feedback signal may be provided by the pilot tracking module as previously described. The linear SRC module is operably coupled to sample a digital signal in accordance with a control feedback signal. The sigma-delta modulator is operably coupled to produce the control feedback signal based on an interpolation ratio. In one embodiment, the interpolation ratio is a ratio between the input sample rate and the output sample rate of the linear interpolator.

Figure 10:
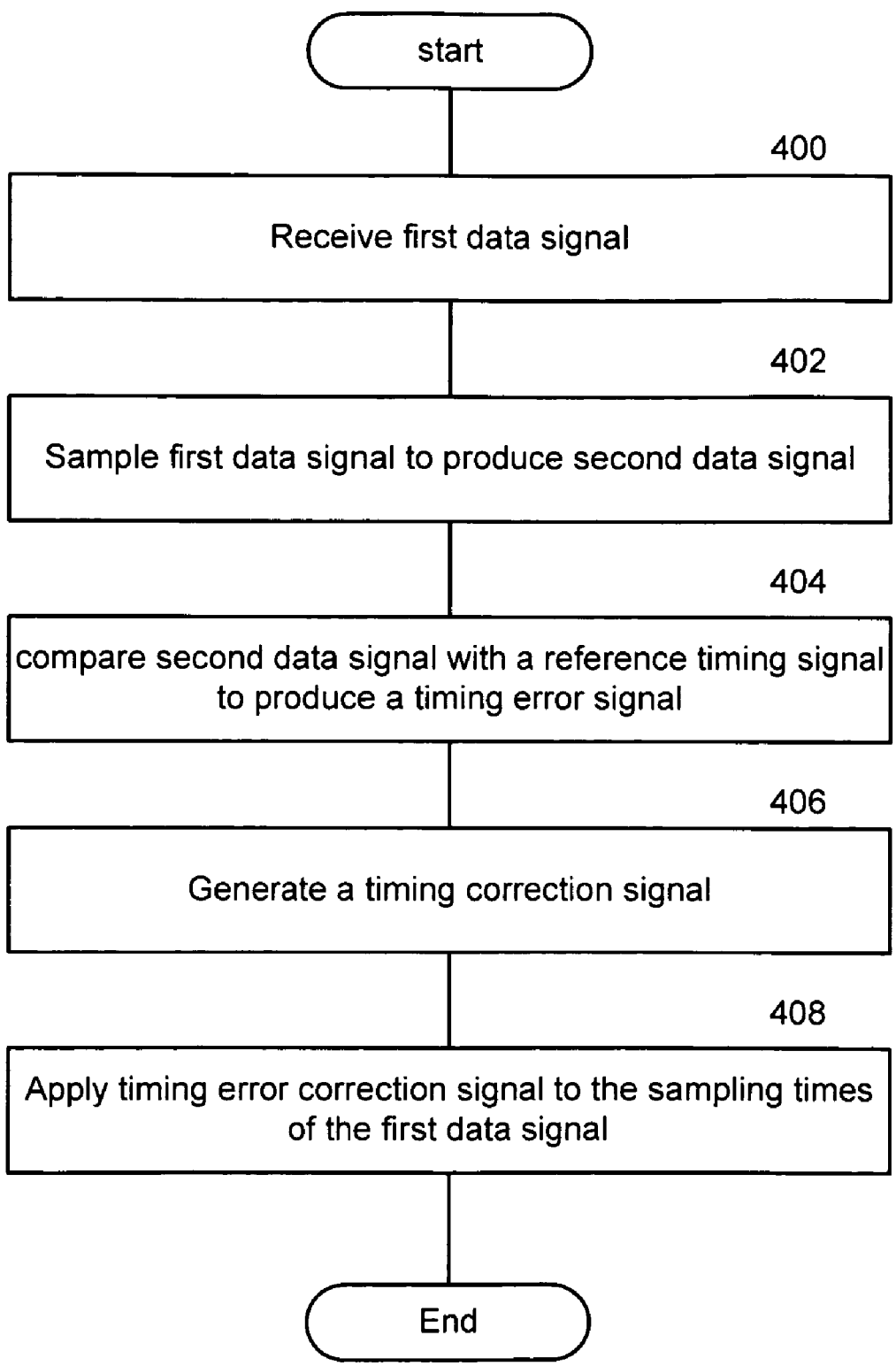
FIG. 10 is a logic flow diagram illustrating a method of pilot tracking in accordance with the present invention.

FIG. 10 provides a logic flow diagram associated with an embodiment of the present invention. At step 400, a signal such as a radio signal is received and sampled. This received signal may have a first time domain associated with it. The received signal is sampled in step 402 to produce a second signal associated with a second time domain. These signals may be composite signals such as composite signal 158 as previously described. The second signal may be decoded or demodulated. The processed second signal may then be compared with a referenced timing signal, digital reference period, to produce a timing error signal in step 404. The resultant signal may be filtered using a filter such as LPF 172. This will result in a feedback error signal which may be compared with a DC reference or null signal to produce an offset signal. When the timing component within the second signal and the reference or pilot tone match, the feedback error signal will produce an offset at or near zero. Then a feedback module, such as a state variable filter and sigma delta modulator (i.e. loop filter and quantizer), would utilize the offset signal to generate a timing correction signal in step 406. Then this timing correction signal would be applied in step 408 to adjust the sampling of the first data signal in step 408 where the resultant is that the timing error correction allows the pilot tone or timing signal component within the received composite signal to be tracked.

Figure 11:
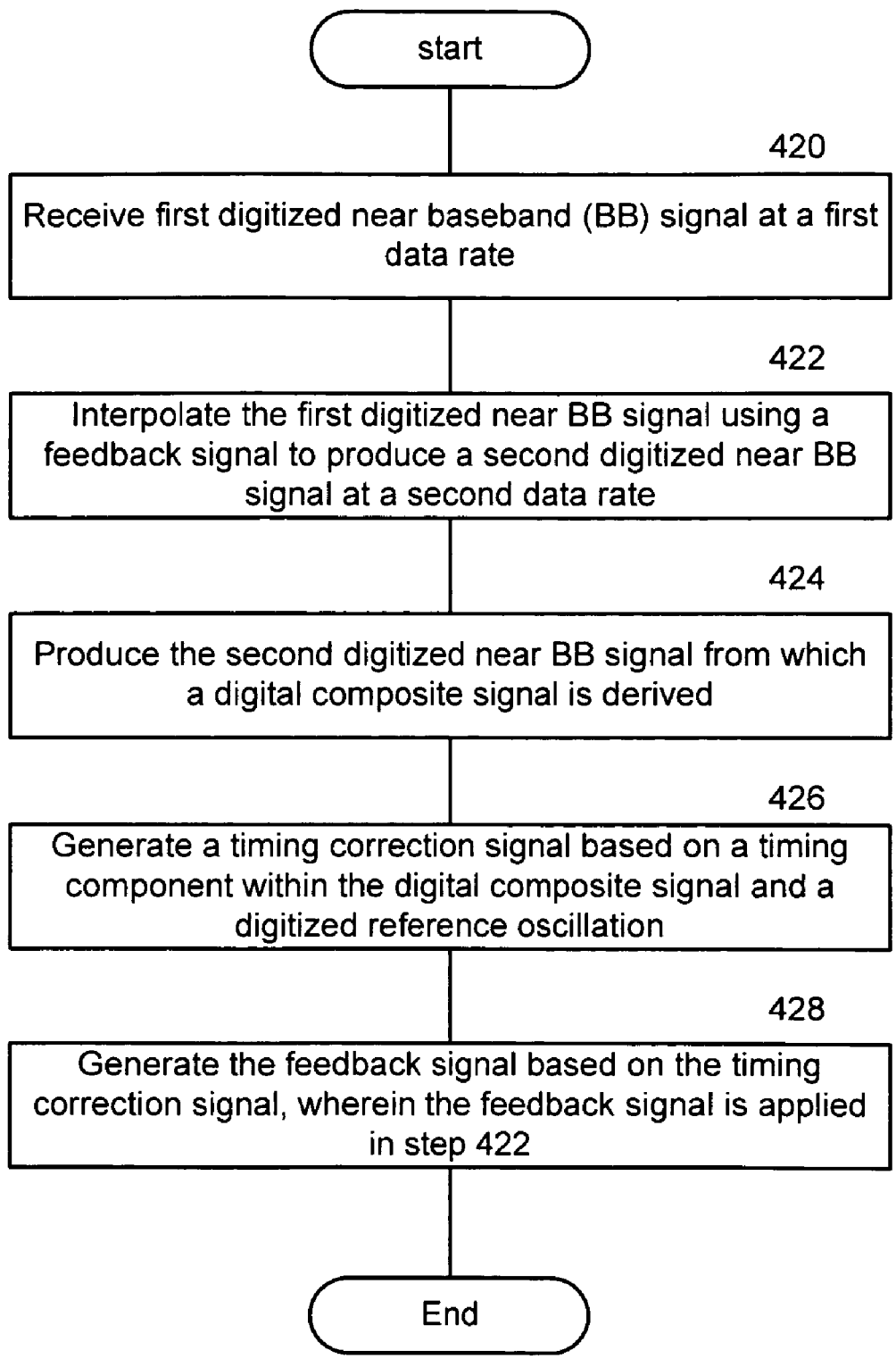
FIG. 11 is a logic flow diagram illustrating a method of pilot tracking in accordance with the present invention.

FIG. 11 provides a second logic flow diagram which describes a method associated with an embodiment of the present invention. At step 420, a signal such as a digitized near baseband radio signal is received and sampled at a first data rate. The digitized near baseband radio signal is sampled in step 422 to produce a second digitized near baseband radio signal having a second data rate. These signals may be composite signals such as composite signal 158 as previously described. The second signal may be decoded or demodulated in step 424 to produce the digital composite signal. The digital composite signal may then be compared with a referenced timing signal, digital reference period, to produce a timing error signal. The resultant signal may be filtered using a filter such as LPF 172. This will result in a feedback error signal which may be compared with a DC reference or null signal to produce an offset signal. When the timing component within the second signal and the reference or pilot tone match, the feedback error signal will produce an offset at or near zero. Then a feedback module, such as a state variable filter and sigma delta modulator (i.e. loop filter and quantizer), would utilize the offset signal to generate a timing correction signal in step 426. Then this timing correction signal would be applied in step 428 to adjust the sampling of the first data signal in step 422 where the resultant is that the timing error correction allows the pilot tone or timing signal component within the received composite signal to be tracked.

As the reader will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, IC process variations, temperature variations, rise and fall times, and/or thermal noise. Such relativity between items ranges from a difference of a few percent to magnitude differences. As the reader will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As the reader will also appreciate, inferred coupling (i.e., where one element is coupled to another element by inference) includes direct and indirect coupling between two elements in the same manner as "operably coupled". As the reader will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a handheld device that incorporates a radio signal decoder IC optimized interface with a digital audio processing IC. As one of average skill in the art will appreciate, other embodiments may be derived from the teaching of the present invention without deviating from the scope of the claims.

What is claimed is:

1. A radio signal decoder operable to process digitized signals, the module comprises:
    a sample rate conversion module operable to receive a first digitized signal having a first data rate, wherein the sample rate conversion module applies a feedback signal to the received first digitized signal to produce a second digitized signal having a second data rate;
    a demodulator operably coupled to the sample rate conversion module, wherein the demodulator is operable to process the second digitized signal to produce a digital composite signal having a known timing component; and
    a pilot tracking module operably coupled to compare the digital composite signal with a reference signal and produce the feedback signal.

2. The radio signal decoder of claim 1, wherein the pilot tracking module further comprises an error sensing module and a feedback module.

3. The radio signal decoder of claim 1, wherein the feedback signal is based on a difference between the known timing component and a digitized reference period.

4. The radio signal decoder of claim 1, wherein the digital composite signal comprises a digitized FM composite signal.

5. The radio signal decoder of claim 2 wherein:
    the error sensing module comprises:
        a mixer, operable to compare the digital composite signal having a timing component with the reference signal;
        a filter operably coupled to the mixer, wherein the filter is operable to filter a timing error signal from an output of the mixer;
        a comparator operably coupled to the filter, wherein the comparator is operable to compare the timing error signal with a null signal and produce an offset signal; and
    the feedback module comprises:
        a loop filter operably coupled to the comparator, wherein the loop filter processes the offset signal to produce a filtered offset; and
        a quantizer operably coupled to the loop filter, wherein the quantizer receives and processes the filtered offset to produce the feedback signal.

6. The radio signal decoder of claim 5, wherein the filter comprises:
    cascaded integrated comb (CIC) filter;
    down sampling by N module; and
    a leaky bucket integrator, wherein the CIC filter, down sampling by N module and leaky bucket integrator are coupled in series.

7. The radio signal decoder of claim 5, wherein the loop filter further comprises:
    a first gain module;
    a second gain module, wherein the first and second gain modules receive an output of the comparator;
    an integrator operably couple to the second gain module, wherein the integrator receives an output of the second gain module;
    a first summing module, operably coupled to the first gain module and integrator, and wherein the first summing module is operable to sum an output of the first gain module and an output of the integrator;
    a second summing module operably coupled to the first summing module, wherein the second summing module sums an output of the first gain module and a level signal, and wherein the second summing module normalizes an output of the loop filter for the quantizer.

8. A method to adjustably convert a first digitized signal having a first data rate to a second digitized signal having a second data rate, comprising:
    sampling the first digitized signal to produce a second digitized signal;
    demodulating the second digitized signal to produce a composite digital signal,
        wherein the composite digital signal includes a known timing signal component;
    comparing the composite digital signal with a digitized reference period to determine a timing error between the known timing signal component and the digitized reference period;
    generating a feedback signal operable to adjust sample timing of the first digitized signal into the second digitized signal based on the timing error; and
    adjusting sample timing of the first digitized signal to produce the second digitized signal having the second data rate.

9. The method of claim 8, wherein the first digitized signal comprises a digitized FM composite digital signal.

10. The method of claim 8, wherein the second digitized signal comprises a digitized FM composite digital signal, wherein the known timing signal component comprises a pilot tone.

11. The method of claim 8, wherein the known timing signal component and digitized reference period are at about 19 KHz.

12. The method of claim 8, wherein:
    the first data rate is a function of a receiver associated with the FM composite digital signal; and
    the second data rate is a function of a transmitter associated with the FM composite digital signal.

13. The method of claim 8, wherein the timing error comprises a difference between the known timing signal component and the digitized reference period.

14. The method of claim 8, wherein the composite digital signal comprises a near baseband digitized FM composite digital signal.

15. A handheld audio system, comprising:
    a digital audio processing system having an input receiving a plurality of channel audio signals; and
    a radio signal decoder system, coupled to said digital audio processing system, comprising:
        a radio receiver system receiving a radio signal and providing a first digitized signal having a first data rate;
        a sample rate conversion module which receives said first digitized signal and a feedback signal, and which uses said feedback signal to convert said first digitized signal to a second digitized signal having a second data rate;
        a demodulator which processes the second digitized signal to produce a digital radio composite signal having a known timing component;
        a pilot tracking module which compares said digital radio composite signal with a first reference signal and which provides said feedback signal; and a channel separation module which receives said digital radio composite signal and which provides said plurality of channel audio signals.

16. The handheld audio system of claim 15, wherein said digital audio processing system comprises:
   a power converter module;
   a memory; and
   a processing module which receives and processes said plurality of channel audio signals.

17. The handheld audio system of claim 15, wherein said radio receiver system comprises:
   a low noise amplifier receiving said radio signal and providing an amplified radio signal;
   a mixing module receiving said amplified radio signal and an oscillation signal and providing a low intermediate frequency signal;
   an analog to digital converter module receiving said low intermediate frequency signal and providing a digital low intermediate frequency signal; and
   a digital baseband conversion module receiving said digital low intermediate frequency signal and providing said first digitized signal.

18. The handheld audio system of claim 15, wherein said pilot tracking module comprises:
   an error sensing module, comprising:
      a mixer which compares said digital composite radio signal with said first reference signal and which provides a timing error signal;
      a low pass filter which filters said timing error signal and which provides a filtered timing error signal; and
      a comparator which compares said filtered timing error signal with a second reference signal and which provides an offset signal; and
   a feedback module, comprising:
      a loop filter which processes said offset signal to provide a filtered offset signal; and
      a quantizer which receives and processes said filtered offset signal and which provides said feedback signal.

19. The handheld audio system of claim 18, wherein said low pass filter comprises:
   a cascaded integrated comb (CIC) filter receiving said timing error signal;
   a down sampling by N module which down samples said timing error signal by N to provide a down sampled timing error signal; and
   a leaky bucket integrator which receives said down sampled timing error signal and which provides said filtered timing error signal.

20. The handheld audio system of claim 18, wherein said loop filter comprises:
   first and second gain modules each receiving said offset signal;
   an integrator which receives an output of said second gain module;
   a first summing module which sums an output of said first gain module and an output of said integrator; and
   a second summing module which sums an output of said first gain module and a level signal, and wherein said second summing module normalizes an output of said loop filter for said quantizer.

* * * * *